United States Patent
Zhu et al.

(10) Patent No.: US 12,124,396 B2
(45) Date of Patent: Oct. 22, 2024

(54) METHOD FOR ADJUSTING DRIVE LETTERS, ELECTRONIC DEVICE, AND COMPUTER READABLE STORAGE MEDIUM APPLYING THE METHOD

(71) Applicant: Fulian Precision Electronics (Tianjin) Co., LTD., Tianjin (CN)

(72) Inventors: Jian-Hua Zhu, Tianjin (CN); Jie Yuan, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 0 days.

(21) Appl. No.: 18/137,396

(22) Filed: Apr. 20, 2023

(65) Prior Publication Data
US 2024/0104044 A1 Mar. 28, 2024

(30) Foreign Application Priority Data
Sep. 22, 2022 (CN) .......................... 202211158741.3

(51) Int. Cl.
*G06F 13/40* (2006.01)
*G06F 13/10* (2006.01)

(52) U.S. Cl.
CPC ........ *G06F 13/4081* (2013.01); *G06F 13/102* (2013.01)

(58) Field of Classification Search
None
See application file for complete search history.

(56) References Cited

U.S. PATENT DOCUMENTS

| | | | |
|---|---|---|---|
| 10,990,415 B2* | 4/2021 | He | G06F 9/44505 |
| 2013/0117488 A1* | 5/2013 | Perry | G11B 33/124 |
| | | | 710/304 |
| 2020/0210163 A1* | 7/2020 | Lang | G06F 8/61 |

FOREIGN PATENT DOCUMENTS

CN 104699423 A 6/2015

* cited by examiner

*Primary Examiner* — Farley Abad
*Assistant Examiner* — Dayton Lewis-Taylor
(74) *Attorney, Agent, or Firm* — ScienBiziP, P.C.

(57) ABSTRACT

A method for adjusting system drive letters comprises acquires a system drive letter of an action hard disk in response to the identified action hard disk. If a plugging position of the action hard disk is the extension slot, the slot value corresponding to the action hard disk is acquired. The system drive letter is changed to a slot drive letter based on the slot value. If the system drive letter is shifted, the system drive letter is adjusted to be the slot drive letter for reducing the condition of failing to search or call the files in the action hard disk based on the original system drive letter. A convenience of searching or calling the files in the action hard disk is improved. An electronic device and a computer readable storage medium applying the method are also disclosed.

18 Claims, 5 Drawing Sheets

METHOD FOR ADJUSTING DRIVE LETTERS, ELECTRONIC DEVICE, AND COMPUTER READABLE STORAGE MEDIUM APPLYING THE METHOD

FIELD

The subject matter herein generally relates to computer technology.

BACKGROUND

In server field, a server or a computer includes a plurality of hard disks for storing data. The server or the computer defines a plurality of slots, and the hard disks are plugged in the slots respectively. A processor in the server or the computer allocates system drive letters to the hard disks plugged in the slots according to a predetermined rule. For example, when the processor runs Linux system, the system drive letters, such as "sda", "sdb", and "sdc", are allocated to the hard disks. When reading files stored in a specified hard disk by an operator or calling the files by the operation system, a file directory corresponding to the specified hard disk is acquired based on the corresponding system drive letter, and the files are obtained based on the file directory.

While the hard disk being hot plugged, the operation system fails to allocate the system drive letter to the hard disk according to the predetermined rule, and the system drive letter allocated to the hard disk is shifted. The operation system or the operator fails to search or call the files based on the original system drive letter when the system drive letter is shifted.

There is room for improvement in the art.

BRIEF DESCRIPTION OF THE DRAWINGS

Implementations of the present disclosure will now be described, by way of example only, with reference to the attached figures.

DETAILED DESCRIPTION

Figure 1:
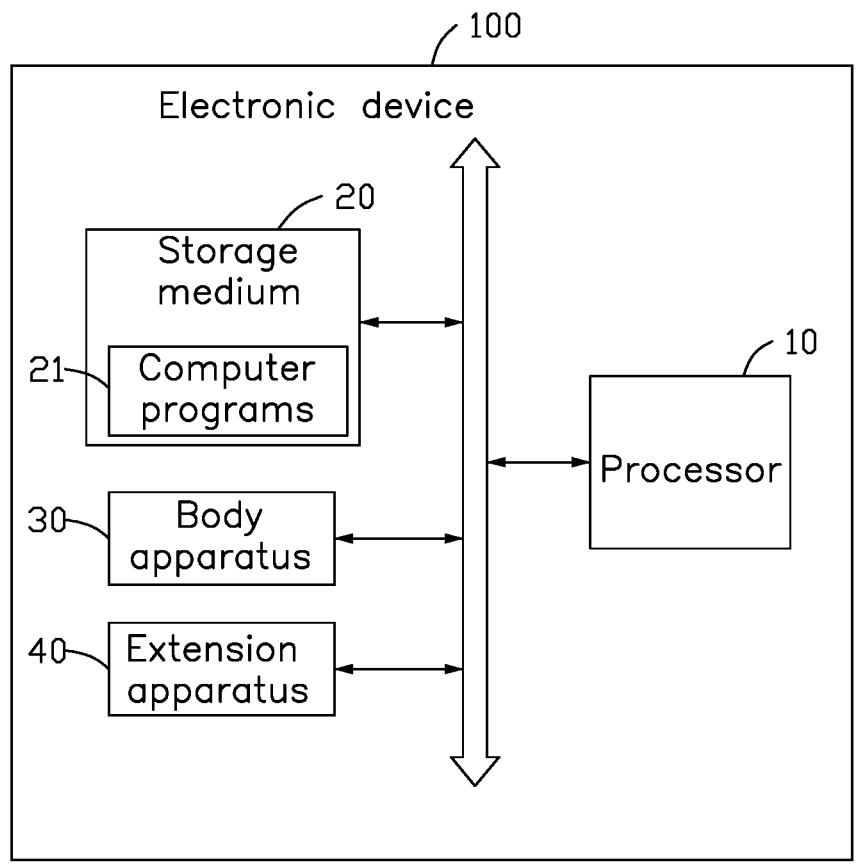
FIG. 1 is a diagram illustrating an embodiment of an electronic device according to the present disclosure.

The present disclosure is described with reference to accompanying drawings and the embodiments. It will be understood that the specific embodiments described herein are merely part of all embodiments, not all the embodiments. Based on the embodiments of the present disclosure, it is understandable to a person skilled in the art, any other embodiments obtained by persons skilled in the art without creative effort shall all fall into the scope of the present disclosure. It will be understood that the specific embodiments described herein are merely some embodiments and not all.

It will be understood that, even though the flowchart shows a specific order, an order different from the specific order shown in the flowchart can be implemented. The method of the present disclosure can include one or more steps or actions for achieving the method. The steps or the actions in the method can be interchanged with one another without departing from the scope of the claims herein.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

Terms "first", "second", and the like used in the specification, the claims, and the accompanying drawings of the present disclosure are used to distinguish different objects rather than describe a particular order. A term "comprise" and its variations are intended to cover a non-exclusive inclusion. For example, a process, method, system, product, or apparatus including a series of steps or units is not limited to the listed steps or units, and may optionally include other steps or units that are not listed, or other steps or units inherent to the process, method, product, or device.

It will be understood that, even though the flowchart shows a specific order, an order different from the specific order shown in the flowchart can be implemented. The method of the present disclosure can include one or more steps or actions for achieving the method. The steps or the actions in the method can be interchanged with one another without departing from the scope of the claims herein.

FIG. 1 shows an electronic device 100. The electronic device 100 may execute a method for adjusting system drive letters, thus the shifted system drive letter is adjusted while hard disks in the electronic device 100 being hot plugged.

In one embodiment, the electronic device 100 includes a processor 10, a storage medium 20, a body apparatus 30, and an extension apparatus 40, which may be connected and communicate with each other through a communication bus.

The processor 10 may be a general central processing unit (CPU), a microprocessor, an application specific integrated circuit (ASIC), or one or more integrated circuits for controlling the execution of the above program.

The storage medium 20 may be a read-only memory (ROM) or other types of static storage devices that can store static information and instructions, a random access memory (RAM) or other types of dynamic storage devices that can store information and instructions, or an electrically erasable programmable read-only memory (electrically erasable programmable read only memory, EEPROM), compact disc read only memory (CD-ROM) or other optical disc storage, optical disc storage (including compact disc, laser disc, optical disc, digital versatile disc, Blu ray disc, etc.), magnetic disk storage medium or other magnetic storage device, or any other medium that can be used to carry or store desired program code in the form of instruction or data structure and can be accessed by a computer, but is not limited thereto. The storage medium 20 may exist independently and be connected to the processor 10 through a bus. The storage medium 20 may also be integrated with the processor 10.

The processor 10, the storage medium 20, and the extension apparatus 40 are mounted on the body apparatus 30. The extension apparatus 40 defines a plurality of extension slots, which are used for plugging with the hard disks. The body apparatus 30 defines at least one body slot, which is used for plugging with the hard disk.

It is understood that both of the body slot and the extension slots may be plugged with the hard disks. The hard disk plugged in the body slot may store operation programs of an operation system of the electronic device 100. The hard disk plugged in the extension slots may store files be viewed by operators, and scripts be implemented by the operation system, and the like.

For example, the electronic device 100 may be a server, the body apparatus 30 may be a motherboard of the server, the processor 10 may be the CPU of the server, the storage medium 20 may be a memory plugged on the body slot of the hard disk and the server, and the extension apparatus 40 may be a host bus adapter (HBA) and attached devices mounted on the motherboard.

It is understood that the electronic device 100 may include a plurality of hard disks. After the operation system of the server runs, the operation system may allocate a plurality of system drive letters to the plurality of hard disks according to a predetermined rule. The operators may search a directory corresponding to the hard disk based on the system drive letters for searching or calling specified files in the hard disks. While running programs, the server may call files in specified hard disks based on the system drive letters.

For example, the server may be a server run by Linux system. The Linux system may allocate system drive letters according to a scanning sequence. The system drive letters may be "sda", "sdb1", and "sdb2", "sdz", and the like. The sequence of letters corresponds to the sequence of the plurality of hard disks identified by the operation system, such as "a", "b", and the like. The number corresponds to values of default partitions in each hard disk, such as "1", "2", and the like. The server may allocate the system drive letters to the plurality of hard disks according to the sequence of the letters and the sequence of the numbers in ascending order.

It is understood that the system drive letter may include a first letter part and a second letter part. Each hard disk corresponds to a system drive letter. The system drive letters have a common first letter part and have different second letter parts. In Linux system, the system drive letter may be "sda", "sdb1", and "sdb2", "sdz", and the like. The first letter part of the system drive letter "sda" is "sd", and the second letter part is "a". The first letter part of the system letter "sdb1" is "sd", and the second letter part is "b 1".

It is understood that a shifted system drive letter is that the server or the computer fails to allocate the system drive letter to the plurality of hard disks according to the predetermined rule. For example, after hot plugging one hard disk, the operation system or the computer re-allocated a new system drive letter for the hard disk being hot plugged, which have been allocated with an original system drive letter. Thus, the new system drive letter and the original system drive letter correspond to a same hard disk, which is confused to the processor 10. Due to the shifted system drive letter, the operation system of the server or the computer and the operator fails to acquire the files in the specified hard disk according to the original directory address.

In one embodiment, the processor 10 executes the method for adjusting the system drive letters while the operation system of the electronic device 100 automatically re-allocates a new system drive letter for the hard disk being hot plugged. The failure of acquiring the files in the specified hard disk according to the predetermined directory address by the operation system of the electronic device 100 and the operators is reduced.

Figure 2:
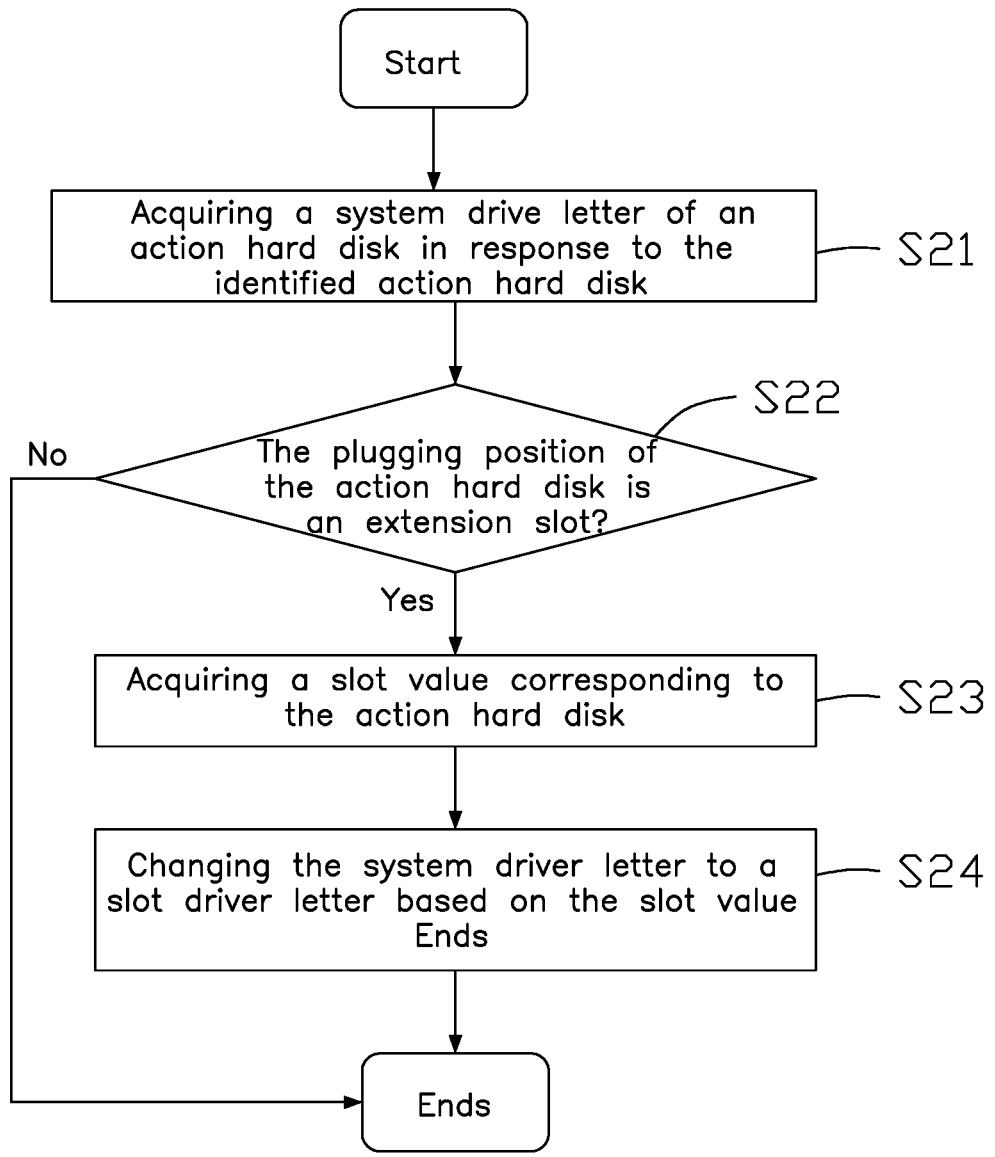
FIG. 2 is a flowchart illustrating an embodiment of a method for adjusting drive letters according to the present disclosure.

FIG. 2 shows a flowchart of the method for adjusting system drive letters, the method may comprise at least the following steps, which also may be re-ordered.

In block S21, a system drive letter of an action hard disk is acquired in response to the identified action hard disk.

It should be understood that when the action hard disk works for the electronic device 100, the processor 10 identifies actions of adding or changing the hard disk. The action of changing the hard disk is a hot plugging action of a same hard disk plugged in the extension slot or the body slot. When the electronic device 100 starts or the hard disk in the electronic device 100 is hot plugged, the processor 10 identifies the hard disk being newly added or hot plugged.

For example, the operation system of the electronic device 100 is Linux system. The Linux system may monitor action events occurred in the electronic device 100 for managing device directory under/dev directory by a device manager (udev). The action events may include an adding action, a changing action, and a reducing action. While monitoring the hard disk being added or changed, the device manager may allocate a system drive letter to the action hard disk and generate a device directory corresponding to the allocated system drive letter under/dev directory. After the hard disk being added or changed, the device manager may acquire a head letter of unallocated letters as the allocated letter of the action hard disk according to the order of the letters and generates the system drive letter of the action hard disk. For example, after the Linux system allocates the system drive letters, "sda", "sdb", and "sdc", when the hard disk corresponding to the system drive letter "sdc" being hot plugged, the device manager acquires the action event of the hard disk and identifies the hard disk corresponding to the original drive letter "sdc" as the action hard disk. The device manager re-allocates a new system drive letter "sdd" to the action hard disk, deletes the /dev/sdc directory, and adds a /dev/sdd directory.

Due to the system drive letter re-allocated by the device manger, the processor 10 may requires the re-allocated system drive letter of the action hard disk.

It is understood that while the electronic device 100 works and the device manger identifies the hard disk being hot plugged in the electronic device 100, the device manager may determine the identified hard disk as the hard disk with action event and re-allocates the system drive letter to all the hard disks.

In block S22, determining whether a plugging position of the action hard disk is the extension slot.

If the plugging position of the action hard disk is the extension slot, the procedure goes to block S23. If the plugging position of the action hard disk is the body slot, the procedure ends.

In one embodiment, the plugging position may include the extension slots and the at least one body slot. If the plugging position of the action hard disk is the extension slot, the action hard disk is plugged in the extension slot of the extension apparatus 40. If the plugging position of the action hard disk is the body slot, the action hard disk is plugged in the body slot of the body apparatus 30.

In one embodiment, if the plugging position of the action hard disk is the body slot, the processor 10 does not adjust the system drive letter of the action hard disk, and the procedure ends. The processor 10 further executes the method for adjusting the system drive letter of another action hard disk or executes the method for adjusting the system drive letter of the action hard disk if the action hard disk is identified again.

In one embodiment, the hard disk plugged in the body slot is configured to store system files of the operation system of the electronic device 100. The hard disk plugged in the body slot fails to be hot plugged. When the electronic device 100 works, the hard disk plugged in the body slot is firstly identified as the action hard disk by the processor 10. The processor 10 allocates a system drive letter to the identified action hard disk. The processor 10 further determines the plugging position of the action hard disk by implementing the block S22 and ends the method for adjusting the system drive disk of the action hard disk.

For example, the operation system of the electronic device 100 is Linux system. The processor 10 may call the system files of the Linux system stored in the storage medium 20 to run the Linux system. When the electronic device 100 works, the processor 10 being powered may execute the Linux system and identify the action hard disk plugged in the body slot by the device manager. By the device manager, the system drive letter is allocated to the action hard disk plugged in the body slot. The processor 10 executes the block S22 for determining the plugging position of the action hard disk to be the body slot and determining the action hard disk to be the hard disk for storing the system files of the Linux system. The processor 10 does not adjust the system drive letter of the action hard disk and identifies another action hard disk.

In some embodiment, the block of acquiring the plugging position of the action hard disk may include: determining whether a driver corresponding to the action hard disk is a driver of the extension apparatus 40. If the driver corresponding to the action hard disk is a driver of the extension apparatus 40, the plugging position of the action hard disk is confirmed as the extension slot, and the procedure goes to block S23. If the driver corresponding to the action hard disk is a driver of the body apparatus 30, the plugging position of the action hard disk is confirmed to be the body slot, and the procedure ends.

It is understood that when the processor 10 calls the files or the programs in the hard disk, the driver in the body apparatus 30 or the extension apparatus 40 is implemented for transmitting information between the processor 10 and the hard disk. The processor 10 may determine whether the implemented driver is the driver of the extension apparatus 40 for identifying the plugging position of the action hard disk while the processor 10 calls the files or the programs from the action hard disk.

Figure 3:
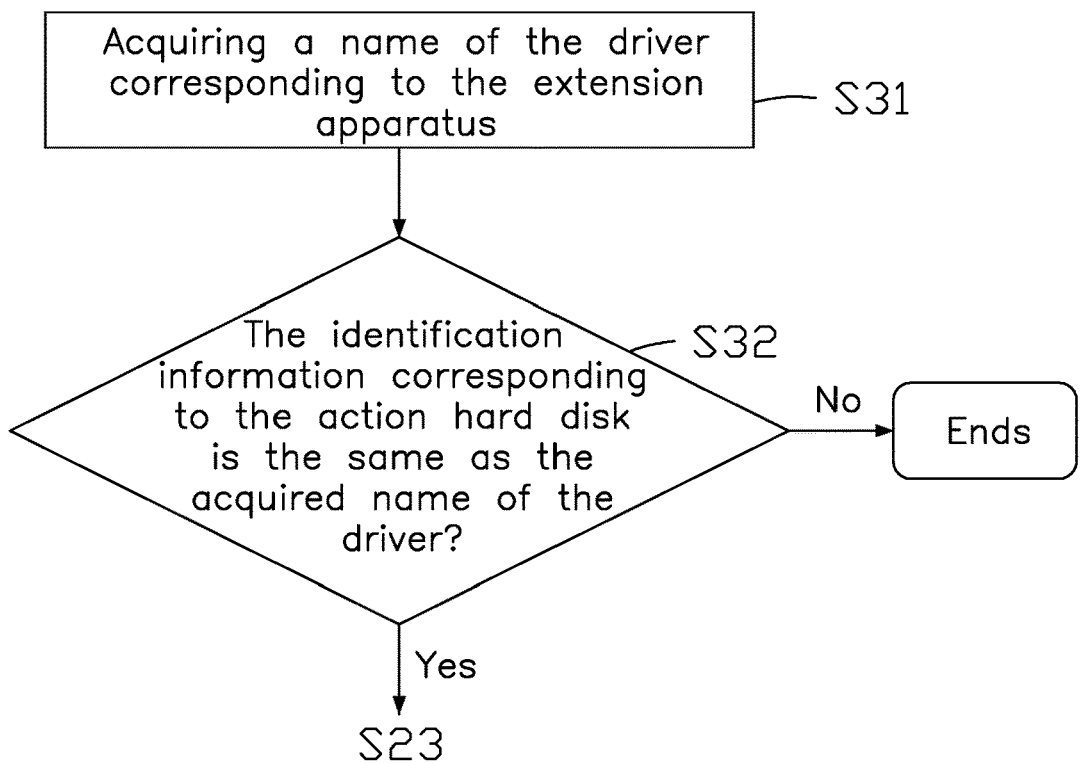
FIG. 3 is a detail flowchart illustrating a first embodiment of block S22 of the flowchart in FIG. 2 according to the present disclosure.

FIG. 3 shows a first embodiment of a detail flowchart of the block S22. The block S22 further includes the following steps. In one embodiment, information of the extension apparatus 40 of the electronic device 100 is known, such as a brand and a mode. A name of the driver of the extension apparatus 40 is also known.

In block S31, the name of the driver corresponding to the extension apparatus 40 is acquired.

It is understood that the known name of the driver is stored in the storage medium 20, and the processor 10 may acquires the name of the driver of the extension apparatus 40 from the storage medium 20.

In block S32, determining whether identification information corresponding to the action hard disk is same as the acquired name of the driver.

If the identification information of the action hard disk is same as the acquired name of the driver, the driver corresponding to the action hard disk is the driver of the extension apparatus 40, and the procedure goes to block S23. If the identification information of the action hard disk is different from the acquired name of the driver, the driver corresponding to the hard disk is not the driver of the extension apparatus 40, and the procedure ends.

It is understood that the identification information is information of a predetermined position in the hardware information of the action hard disk. The processor 10 acquires the hardware information of the action hard disk by known and open-source instructions. The information of the predetermined position in the hardware information may be a name of the driver for transmitting information between the processor 10 and the action hard disk. For example, the operation system of the electronic device 100 is Linux system, while running the Linux system, the processor 10 may acquire hardware information of the action hard disk by a "udevadm" instruction. The predetermined position may be a second column in a row of recorded information with driver name in the hardware information.

It is understood that the information is transmitted between the processor 10 and the action hard disk through the driver of the extension apparatus 40 if the driver corresponding to the action hard disk is the driver of the extension apparatus 40. Thus, the plugging position of the action hard disk is the extension slot. Otherwise, the plugging position of the action hard disk is the body slot.

Figure 4:
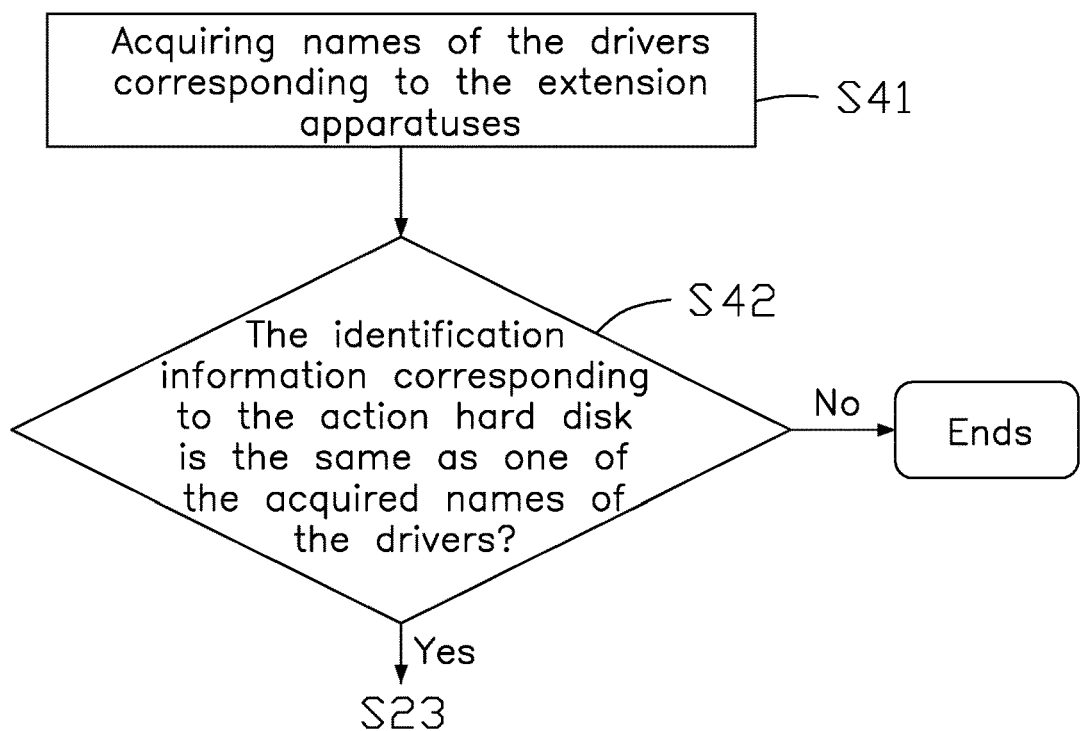
FIG. 4 is a detail flowchart illustrating a second embodiment of block S22 of the flowchart in FIG. 2 according to the present disclosure.

FIG. 4 shows a second embodiment of a detail flowchart of the block S22. The block S22 further includes the following steps. In one embodiment, information of the extension apparatus 40 of the electronic device 100 is known, such as a brand and a mode. There are several extension apparatuses 40 with different drivers. Names of the drivers are different from each other.

In block S41, names of the drivers corresponding to the extension apparatuses 40 are acquired.

In block S42, determining whether identification information corresponding to the action hard disk is same as one of the acquired names of the drivers.

If the identification information of the action hard disk is same as one of the acquired names of the drivers, the driver corresponding to the action hard disk is the driver of the extension apparatus 40, and the procedure goes to block S23. If the identification information of the action hard disk is different from all the acquired names of the drivers, the driver corresponding to the hard disk is the driver of the body apparatus 30, and the procedure ends.

It is understood that the processor 10 may acquires names of the drivers corresponding to the extension apparatuses 40 configured to the electronic device 100 while the name of the driver of the extension apparatus 40 is unknown to staff. The processor 10 compares the identification information with the names of the drivers one by one. If one of the names of the drivers is same as the identification information, the plugging position of the action hard disk is determined to be the extension slot, and the information of the extension apparatus 40 is determined, such as the brand and the mode. Otherwise, the plugging position of the action hard disk is determined to be the body slot.

It is understood that the names of the drivers of the extension apparatuses 40 configured to the electronic device 100 is stored in the storage medium 20.

Figure 5:
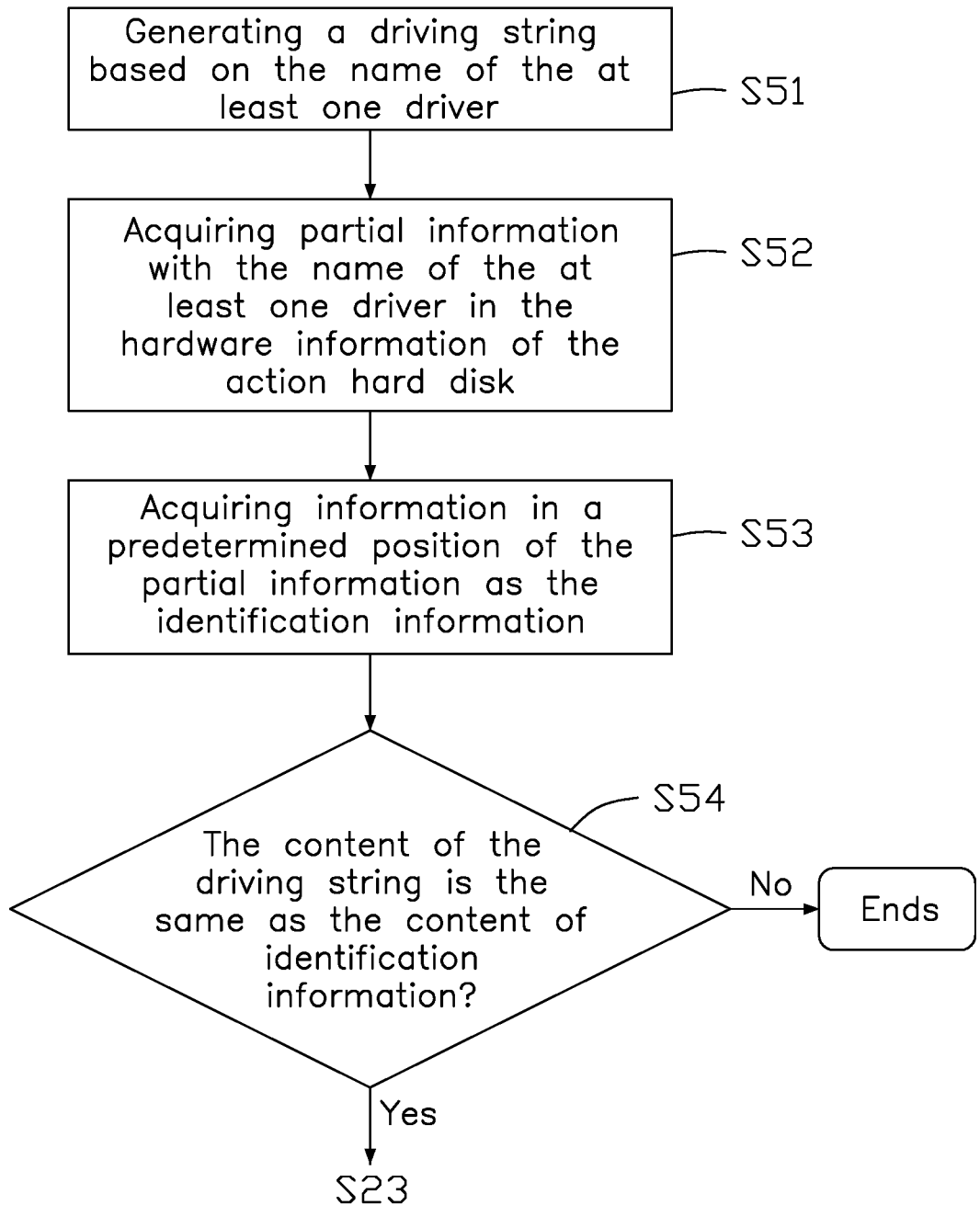
FIG. 5 is a detail flowchart illustrating an embodiment of block S32 of the flowchart in FIG. 3 according to the present disclosure.

FIG. 5 shows a detail flowchart of the block S32. The block S32 further includes the following steps.

In block S51, a driving string is generated based on the name of the at least one driver.

It is understood that the processor 10 generates one or more driving string corresponding to the known name of the at least one driver.

For example, the processor 10 runs a code "lsi="mpt3sas"" and a code "pmc="smartpqi"" to implement the block S51. The "lsi" and the "pmc" represent two driving strings. A content of the driving string "lsi" is "mpt3sas", which is the name of the driver of a HBA with a LSI brand. A content of the driving string "pmc" is "smartpqi", which is the name of the driver of a HBA with a PMC brand.

In block S52, partial information with the name of the at least one driver in the hardware information of the action hard disk is acquired.

It is understood that the processor 10 acquires the hardware information of the action hard disk by known and open-source instructions. If there is one name of the driver stored in the storage medium 20, the processor 10 generates one driving string while the block S51 is implemented, searches for the information in the hardware information, which is the same as the name of the driver in the storage medium 20 while the block S52 is implemented, and acquires partial information with the name of the driver in the hardware information. If there are several names of the drivers, the processor 10 generates several driving strings while the block S51 is implemented, searches for the information in the hardware information, which are the same as the names of the drivers in the storage medium 20 in order while the block S52 is implemented, and acquires partial information with the names of the drivers in the hardware information.

It is understood that if there is one name of the driver in the storage medium 20 and the processor 10 fails to search the name of the driver in the hardware information of the action hard disk, the partial information acquired by the processor 10 is null. If there are several names of the drivers in the storage medium 20 and the processor 10 fails to search any one of the names of the drivers in the hardware information of the action hard disk, the partial information acquired by the processor 10 is null.

It is understood that the partial information may be one row of the information in the hardware information. In one embodiment, if there is the name of the driver in the hardware information, the hardware information only includes one name of the driver.

In block S53, information in a predetermined position of the partial information is acquired as the identification information.

It is understood that the predetermined position may be a position identified by staff based on an information format of the hardware information before implementing the method for adjusting the system drive letter. For example, the predetermined position may be a second column in the partial information.

It is understood that the hardware information of the hard disk plugged in the extension slots and the body slot are in a common information format. If there is the name of the driver in the partial information of the hardware information, the content in the predetermined position of the partial information is the name of the driver. The staff may identify the predetermined position before implementing the method for adjusting the system drive letter based on the position of the name of the driver appeared in the hardware information.

It is understood that if the partial information acquired by the processor 10 is null, the identification information acquired by the block S53 is null.

For example, the processor 10 runs a code "driver='udevadm info -a /dev/$SD|grep mpt3sas|awk -F" "'{printf $2}'"", for implementing the block S52 and the block S53. The code corresponds to the name "mpt3sas" of the driver. A content of the code is the second letter part of the system drive letter of the action hard disk. While executing the code corresponding to the driver, the processor 10 may acquire the hardware information of the action hard disk, search for the row of the hardware information including the content of "mpt3sas". If there is the row of the hardware information including the content "mpt3sas", the information in the second column in the row of the hardware information including the content "mpt3sas". If the hardware information includes the content "mpt3sas", the content of the identification information acquired by the processor 10 is "mpt3sas". If there is no content "mpt3sas" in the hardware information, the content of the identification information acquired by the processor 10 is null.

In block S54, determining whether the content of the driving string is the same as the content of the identification information.

If the content of the driving string is the same as the identification information, the identification information is the same as the name of the driver and the procedure goes to block S23. If the content of the driving string is different from the identification information, the identification information is different from the name of the driver and the procedure ends.

It is understood that if the identification information is not null, the content of the identification information is the name of the driver and is the same as the content of the driving string. If the identification information is null, the identification information is different from the content of the driving string.

It is understood that the storage medium 20 stores M names of the drivers and the processor 10 executes the blocks S51 to S53 for M times according to the M names of the drivers and generates M identification information. The processor 10 executes the block S54 for M times based on the M identification information respectively for determining whether the content of the identification information is the same as the content of one of the driving strings. If the block S54 being executed for M times, the processor 10 may determine that whether the content of the identification information is the same as the content of one of the driving strings. If the content of the identification information is the same as the content of one of the driving strings, the processor 10 determines the identification information is the same as the name of one of the drivers. If the content of the M identification information is different from the content of each of the M driving strings, the processor 10 determines the identification is different from the name of each of the drivers. M is a positive integer, which is equal to or larger than 2.

It is understood that the plugging position of the action hard disk is the extension slot of the extension apparatus 40 if the identification information is same as the name of one of the drivers.

Referring to FIG. 2 again, in block S23, a slot value corresponding to the action hard disk is acquired.

It is understood that the slot value may be predefined sequence number of the extension slots of the extension apparatus 40. The extension apparatus 40 defines the sequence number of the extension slots in a specified order while manufacturing. For example, the sequence number of slots on the HBA is 0, 1, 2, β, n. n is a positive integer.

It is understood that the processor 10 acquires the position information of the extension slot corresponding to the action hard disk by known and open-source instructions.

For example, in Linux system, the processor 10 may acquire slot position information of the extension slot corresponding to the action hard disk by a "lsscsi" instruction. The position of the slot is acquired from the position information. For example, the content of the slot information includes "slot1", "slot2", . . . , "slotn", n is a constant. The number in the slot information "n" is the slot value, which represent a sequence number of the slot in the extension apparatus 40.

In block S24, the system drive letter of the action hard disk is changed to a slot drive letter based on the slot value.

It is understood that while the electronic device 100 works, the operation system of the electronic device 100 allocates system drive letters to the plurality of hard disks, and the processor executes the method for adjusting the system drive letters of the hard disks plugged in the extension slots to be the slot drive letters. If the hard disk being hot plugged or newly added on the extension slots, the operation system of the electronic device 100 re-allocates the system drive letters to the action hard disk. The processor 10 executes the method for adjusting the system drive letters of the action hard disk plugged in the extension slot to be the slot drive letter. During the electronic device 100 works, the system drive letter of the hard disks plugged in the extension slots are slot drive letters. If the staff or the processor 10 calls the files stored in the hard disk plugged in the extension slots, the slot drive letter serves as a directory address for searching the files. For example, the processor 10 runs the Linux system and a condition of botting the electronic device 100 or hot plugging the hard disk in the extension slot is generated, the system drive letter acquired by the processor 10 is "SDD" and the slot information corresponding to the action hard disk is "slot2". The "2" serves as the slot value, and the processor 10 changes the system drive letter "sdd" to "sd2".

Figure 6:
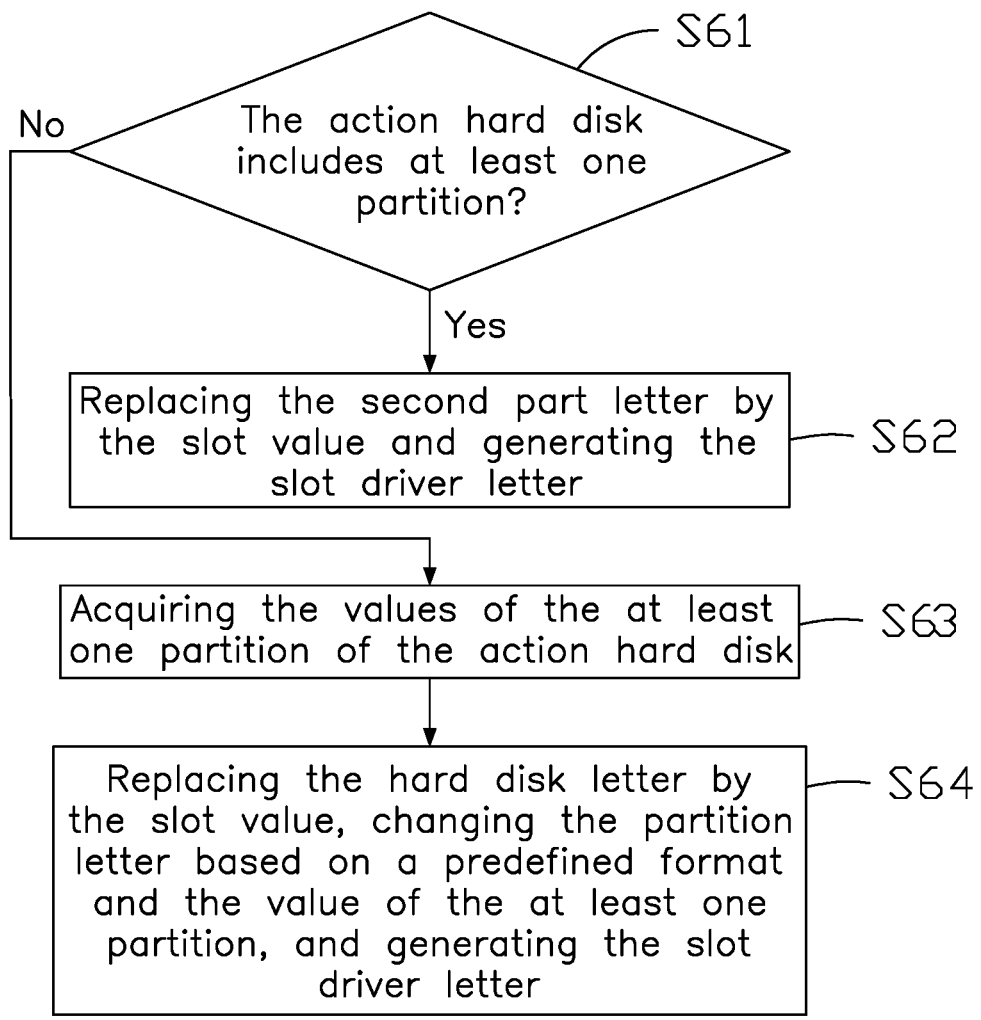
FIG. 6 is a detail flowchart illustrating an embodiment of block S24 of the flowchart in FIG. 2 according to the present disclosure.

FIG. 6 shows a detail flowchart of the block S24. The block S24 further includes the following steps.

In block S61, determining whether the action hard disk includes at least one partition.

If there is no partition in the action hard disk, the procedure goes to block S62. If the action hard disk includes at least one partition, the procedure goes to block S63.

It is understood that the action hard disk may include a plurality of partitions. Each partition stores different files. The second letter part of each of system drive letters may include a hard disk letter and a partition letter part. Each hard disk letter part corresponds to one hard disk. Each partition letter part corresponds to a partition in one hard disk.

For example, the processor 10 runs the Linux system, the system drive letters may be "sdd1", "sdd2", and "sdd3". The "sd" serves as the first letter part, and the "d1", "d2", and "d3" serve as the second letter part. In the second letter part, the "d" serves the hard disk letter part, and the "1", "2", and "3" serve the partition letter parts. There are three partitions in the action hard disk.

It is understood that the processor 10 may check the file directory of the hard disk according to the system drive letter and searches for a sub-directory corresponding to the partition under the file directory of the action hard disk for determining whether the action hard disk includes at least one partition. If there is the sub-directory corresponding to the partition under the file directory of the action hard disk, the action hard disk includes at least one partition.

In block S62, the second letter part is replaced by the slot value and the slot drive letter is generated.

It is understood that if there is no partition in the action hard disk, the processor 10 may delete the second letter part of the system drive letter corresponding to the action hard disk and adds the slot value as the second letter part for generating the slot drive letter corresponding to the action hard disk.

In block S63, the value of the at least one partition of the action hard disk is acquired.

It is understood that the processor 10 may acquire a number of the partition in the system drive letter and the value of the at least one partition by identifying a number of the system drive letter and the partition letter corresponding to the action hard disk or identifying the name of the sub-directory corresponding to the partition under the file directory of the action hard disk.

For example, in the electronic device 100 running the Linux system, the number of the system drive letters corresponding to the action hard disk are four, which are "sdd", "sdd1", "sdd2", and "sdd3". The processor 10 may determine there are three partitions in the action hard disk based on the number of the system drive letters, and the values of each of the partitions are "1", "2", "3".

In block S64, the hard disk letter is replaced by the slot value, the partition letter is changed based on a predefined format and the value of the at least one partition, and the slot drive letter is generated.

It is understood that in Linux system, the slot value and the value of the partition are Arabic numeral. For reducing a condition of error recognition of the slot drive letter due to more than one digit of the Arabic numerals identified by the processor 10 or the staff, in the generated slot drive letter, the value of the at least one partition is adjusted according to the predefined format and replaced the partition letter, thus the slot drive letter is generated. The predefined format may be defined by staff, which is different from the format of the partition, before the method for adjusting the system drive letter being executed.

For example, in Linux system, the predefined format may be "p*". The "*" represents the value of the partition, which is a positive integer. For example, there are three system drive letters corresponding to the action hard disk, which are "sdd1", "sdd2", and "sdd3". The "sd" serves as the first letter part, the "d" serves as the hard disk letter part, and the "1", "2", and "3" serve as the partition letter part. The slot value corresponding to the action hard disk is 0, the values of the partitions corresponding to the partitions of the action hard disk is "1", "2", and "3". The processor 10 executes the block S64, the generated three slot drive letters are "sd0p1", "sd0p2", and "sd0p3".

It is understood that the method for adjusting the system drive letters is executed while the electronic device 100 works and while the condition of hot plugging the hard disk in the electronic device 100 is generated. While the electronic device 100 works, the processor 10 firstly identify the hard disks in the electronic device 100, and the operation system of the electronic device 100 allocates the system drive letters to the identified hard disks. The processor 10 further orderly identifies the identified hard disks as the action hard disk and executes the method for adjusting the system drive letters of the hard disks plugged in the extension slots to be the slot drive letters. The processor 10 may firstly identify the hard disks plugged in the body slot and then identify the hard disks plugged in the extension slots. When there are several hard disks plugged in the body slots, the processor 10 orders the hard disks based on a predefined sequence number of the body slots in ascending order and identifies the hard disk based on that order. When there are several hard disks plugged in the extension slots, the processor 10 orders the hard disks based on a predefined sequence number of the extension slots in ascending order and identifies the hard disk based on that order.

While the electronic device 100 works and one of the hard disks in the electronic device 100 is hot plugged, the processor 10 executes the method for adjusting the system drive letters. When the plugging position of the action hard disk is the extension slot, the processor 10 adjusts the system drive letter of the action hard disk to the slot drive letter. After executing the method for adjusting the system drive letter of the action hard disk, the operation system of the electronic device 100 constantly detects an action time point of each of the hard disks. If there is another hard disk being hot plugged, the processor 10 executes the method for adjusting the system drive letter of the another action hard disk.

Based on the foregoing method for adjusting the system driver disk, the system driver disk is adjusted to the slot drive letter based on the slot value of the extension slot, where the action hard disk is plugged in, while the electronic device 100 works or one of the hard disks being hot plugged. If the staff or the processor 10 searches or calls the files in the action hard disk, the files may be searched in the directory by the directory address corresponding to the action hard disk, which is determined by the slot drive letter. Based on the foregoing method for adjusting the system driver disk, if the system drive letter is shifted, the system drive letter is adjusted to be the slot drive letter, thus the condition of failing to search or call the files in the action hard disk based on the original system drive letter is reduced. A convenience of searching or calling the files in the action hard disk is improved.

Based on a same idea, the present discloses also provides a computer readable storage medium. The computer readable storage medium stores computer programs 21, when executed by the electronic device 100, cause the electronic device 100 to perform the foregoing method for adjusting the system drive letters.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for adjusting system drive letters, being applicable in an electronic device; the electronic device comprises a non-transitory computer readable storage medium with computer instructions and a processor; the processor executes the computer instructions to implement following processes:
    acquiring a system drive letter of an action hard disk allocated by an operation system in response to an action hard disk identified by a device manager of the electronic device when the electronic device starts;
    determining whether a plugging position of the action hard disk is an extension slot;
    acquiring a slot value corresponding to the action hard disk if the plugging position of the action hard disk is the extension slot; and
    changing the system drive letter of the action hard disk to a slot drive letter based on the slot value.

2. The method of claim 1, wherein the method further comprises:
    determining whether a driver corresponding to the action hard disk is a driver of an extension apparatus; the extension apparatus comprises a plurality of extension slots; and
    confirming the plugging position of the action hard disk to be the extension slot if the driver corresponding to the action hard disk is the driver of the extension apparatus.

3. The method of claim 2, wherein the confirming the plugging position of the action hard disk to be the extension slot comprises:
    confirming the plugging position of the action hard disk to be a body slot if the driver corresponding to the action hard disk is not the driver of the extension apparatus.

4. The method of claim 2, wherein the determining whether a driver corresponding to the action hard disk is a driver of an extension apparatus; the extension apparatus comprises a plurality of extension slots comprises:
    acquiring a name of at least one driver corresponding to the extension apparatus; and
    determining whether identification information corresponding to the action hard disk is same as the acquired name of the at least one driver;
    confirming the driver corresponding to the action hard disk to be the driver of the extension apparatus if the identification information of the action hard disk is same as the acquired name of the at least one driver.

5. The method of claim 4, wherein when there are several drivers corresponding to the extension apparatus; the method comprises:
    determining whether identification information corresponding to the action hard disk is same as one of the acquired names of the drivers; and
    confirming the driver corresponding to the action hard disk to be the driver of the extension apparatus if the identification information of the action hard disk is same as one of the acquired names of the drivers.

6. The method of claim 4, wherein the determining whether identification information corresponding to the action hard disk is same as the acquired name of the at least one driver comprises:
    generating a driving string based on the name of the at least one driver;
    acquiring partial information with the acquired name of the at least one driver in the hardware information of the action hard disk;
    acquiring information in a predetermined position of the partial information as the identification information; and confirming the identification information to be the same as the acquired name of the driver if the content of the driving string to be the same as the content of identification information.

7. The method of claim 1, wherein the system drive letter comprises a first letter part and a second letter part; the system drive letters have a common first letter part and have different second letter parts; each second letter part comprises a hard disk letter part and a partition letter part; each hard disk letter part corresponds to one hard disk; each partition letter part corresponds to a partition in the hard disk; the changing the system drive letter of the action hard disk to a slot drive letter based on the slot value comprises:
  determining whether the action hard disk comprises at least one partition; and
  acquiring a value of the at least one partition of the action hard disk if the action hard disk comprises at least one partition; and
  replacing the hard disk letter by the slot value, changing the partition letter based on a predefined format and the value of the at least one partition, and generating the slot drive letter.

8. The method of claim 7, wherein the method further comprises:
  replacing the second part letter by the slot value and generating the slot drive letter if there is no partition in the action hard disk.

9. An electronic device comprises:
a non-transitory computer readable storage medium; and
a processor,
wherein the non-transitory computer readable storage medium stores computer programs, and
the processor executes the computer programs to implement the following processes:
  acquiring a system drive letter of an action hard disk allocated by an operation system in response to an action hard disk identified by a device manager of the electronic device when the electronic device starts;
  determining whether a plugging position of the action hard disk is an extension slot;
  acquiring a slot value corresponding to the action hard disk if the plugging position of the action hard disk is the extension slot; and
  changing the system drive letter of the action hard disk to a slot drive letter based on the slot value.

10. The electronic device of claim 9, wherein the processor further:
  determining whether a driver corresponding to the action hard disk is a driver of an extension apparatus; the extension apparatus comprises a plurality of extension slots;
  confirming the plugging position of the action hard disk to be the extension slot if the driver corresponding to the action hard disk is the driver of the extension apparatus; and
  confirming the plugging position of the action hard disk to be a body slot if the driver corresponding to the action hard disk is not the driver of the extension apparatus.

11. The electronic device of claim 10, wherein the determining whether a driver corresponding to the action hard disk is a driver of an extension apparatus; the extension apparatus comprises a plurality of extension slots comprises:
  acquiring a name of at least one driver corresponding to the extension apparatus; and
  determining whether identification information corresponding to the action hard disk is same as the acquired name of the at least one driver;
  confirming the driver corresponding to the action hard disk to be the driver of the extension apparatus if the identification information of the action hard disk is same as the acquired name of the at least one driver.

12. The electronic device of claim 11, wherein the determining whether identification information corresponding to the action hard disk is same as the acquired name of the at least one driver comprises:
  generating a driving string based on the name of the at least one driver;
  acquiring partial information with the acquired name of the at least one driver in the hardware information of the action hard disk;
  acquiring information in a predetermined position of the partial information as the identification information; and
  confirming the identification information to be the same as the acquired name of the driver if the content of the driving string to be the same as the content of identification information.

13. The electronic device of claim 9, wherein the system drive letter comprises a first letter part and a second letter part; the system drive letters have a common first letter part and have different second letter parts; each second letter part comprises a hard disk letter part and a partition letter part; each hard disk letter part corresponds to one hard disk; each partition letter part corresponds to a partition in the hard disk; the changing the system drive letter of the action hard disk to a slot drive letter based on the slot value comprises:
  determining whether the action hard disk comprises at least one partition; and
  acquiring a value of the at least one partition of the action hard disk if the action hard disk comprises at least one partition;
  replacing the hard disk letter by the slot value, changing the partition letter based on a predefined format and the value of the at least one partition, and generating the slot drive letter; and
  replacing the second part letter by the slot value and generating the slot drive letter if there is no partition in the action hard disk.

14. A non-transitory computer readable storage medium, the non-transitory computer readable storage medium stores computer programs, and the computer programs are executed by at least one processor to implement following steps:
  acquiring a system drive letter of an action hard disk allocated by an operation system in response to an action hard disk identified by a device manager of the electronic device when the electronic device starts;
  determining whether a plugging position of the action hard disk is an extension slot;
  acquiring a slot value corresponding to the action hard disk if the plugging position of the action hard disk is the extension slot; and
  changing the system drive letter of the action hard disk to a slot drive letter based on the slot value.

15. The non-transitory computer readable storage medium of claim 14, wherein the processor further:
  determining whether a driver corresponding to the action hard disk is a driver of an extension apparatus; the extension apparatus comprises a plurality of extension slots;

confirming the plugging position of the action hard disk to be the extension slot if the driver corresponding to the action hard disk is the driver of the extension apparatus; and confirming the plugging position of the action hard disk to be a body slot if the driver corresponding to the action hard disk is not the driver of the extension apparatus.

16. The non-transitory computer readable storage medium of claim 15, wherein the determining whether a driver corresponding to the action hard disk is a driver of an extension apparatus; the extension apparatus comprises a plurality of extension slots comprises:

acquiring a name of at least one driver corresponding to the extension apparatus; and determining whether identification information corresponding to the action hard disk is same as the acquired name of the at least one driver;

confirming the driver corresponding to the action hard disk to be the driver of the extension apparatus if the identification information of the action hard disk is same as the acquired name of the at least one driver.

17. The non-transitory computer readable storage medium of claim 16, wherein the determining whether identification information corresponding to the action hard disk is same as the acquired name of the at least one driver comprises:

generating a driving string based on the name of the at least one driver;

acquiring partial information with the acquired name of the at least one driver in the hardware information of the action hard disk;

acquiring information in a predetermined position of the partial information as the identification information; and confirming the identification information to be the same as the acquired name of the driver if the content of the driving string to be the same as the content of identification information.

18. The non-transitory computer readable storage medium of claim 14, wherein the system drive letter comprises a first letter part and a second letter part; the system drive letters have a common first letter part and have different second letter parts; each second letter part comprises a hard disk letter part and a partition letter part; each hard disk letter part corresponds to one hard disk; each partition letter part corresponds to a partition in the hard disk; the changing the system drive letter of the action hard disk to a slot drive letter based on the slot value comprises:

determining whether the action hard disk comprises at least one partition; and acquiring a value of the at least one partition of the action hard disk if the action hard disk comprises at least one partition;

replacing the hard disk letter by the slot value, changing the partition letter based on a predefined format and the value of the at least one partition, and generating the slot drive letter; and replacing the second part letter by the slot value and generating the slot drive letter if there is no partition in the action hard disk.

* * * * *